(12) United States Patent
Yang et al.

(10) Patent No.: US 10,119,069 B2
(45) Date of Patent: Nov. 6, 2018

(54) FUNCTIONAL MATERIAL, ITS PREPARATION METHOD, COLOR FILTER MATERIAL, AND COLOR FILTER SUBSTRATE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Jiantao Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 371 days.

(21) Appl. No.: 14/770,935

(22) PCT Filed: Nov. 21, 2014

(86) PCT No.: PCT/CN2014/091865
§ 371 (c)(1),
(2) Date: Aug. 27, 2015

(87) PCT Pub. No.: WO2016/015413
PCT Pub. Date: Feb. 4, 2016

(65) Prior Publication Data
US 2016/0369164 A1 Dec. 22, 2016

(30) Foreign Application Priority Data
Jul. 29, 2014 (CN) .......................... 2014 1 0366647

(51) Int. Cl.
| C09K 11/02 | (2006.01) |
| C09C 3/10 | (2006.01) |
| C09C 1/00 | (2006.01) |
| C09K 11/67 | (2006.01) |
| G02B 5/20 | (2006.01) |
| G02F 1/1335 | (2006.01) |

(52) U.S. Cl.
CPC .......... *C09K 11/025* (2013.01); *C09C 1/00* (2013.01); *C09C 1/0084* (2013.01); *C09C 3/10* (2013.01); *C09K 11/676* (2013.01); *C09K 11/678* (2013.01); *G02B 5/207* (2013.01); *G02F 1/133516* (2013.01); *C01P 2004/60* (2013.01); *G02F 2202/36* (2013.01)

(58) Field of Classification Search
USPC .............. 136/258, 252; 430/280.1, 313, 311; 257/40
See application file for complete search history.

(56) References Cited

U.S. PATENT DOCUMENTS

| 4,759,987 A | 7/1988 | Mizobe et al. |
| 6,540,825 B1 | 4/2003 | Quinn et al. |
| 2008/0066802 A1* | 3/2008 | Reddy .................... B82Y 10/00 136/258 |
| 2010/0003507 A1 | 1/2010 | Wu et al. |
| 2013/0037786 A1* | 2/2013 | Miyao ...................... C08K 9/04 257/40 |
| 2013/0146346 A1* | 6/2013 | Nakamoto ............. G03F 7/004 174/258 |

FOREIGN PATENT DOCUMENTS

| CN | 1718614 A | 1/2006 |
| CN | 100999589 A | 7/2007 |
| CN | 101225208 A | 7/2008 |
| CN | 101260235 A | 9/2008 |
| CN | 101343425 A | 1/2009 |
| CN | 101426338 A | 5/2009 |
| CN | 101805517 A | 8/2010 |
| CN | 102039100 A | 5/2011 |
| CN | 103555003 A | 2/2014 |
| CN | 103739205 A | 4/2014 |
| CN | 1656148 A | 8/2015 |
| EP | 1387367 B1 | 2/2004 |
| JP | 2005-029584 A | 2/2005 |
| TW | 201002761 A | 1/2010 |
| WO | 2013/003397 A2 | 1/2013 |

OTHER PUBLICATIONS

International Search Report & Written Opinion Appln. No. PCT/CN2014/091865; dated May 13, 2015.
First Chinese Office Action Appln. No. 201410366647.6; dated Jul. 14, 2015.
Extended European Search Report dated Apr. 6, 2018; Appln. No. 14882799.1.

* cited by examiner

*Primary Examiner* — Monique R Peets
(74) *Attorney, Agent, or Firm* — Ladas & Parry LLP

(57) ABSTRACT

The present invention provides a functional material and a method for preparing the same, as well as a color filter material and a color filter substrate. The present invention belongs to the display technical field and can solve the problem that existing color filter films are environmentally unfriendly and have poor heat resistance and unsatisfactory colors. The functional material of the present invention includes an inorganic powder whose surface has a modified layer, wherein the inorganic powder includes any one or more of aluminum oxide, magnesium oxide, zinc oxide, zirconium oxide, silicon dioxide, titanium dioxide, boron oxide, diiron trioxide, calcium oxide, potassium oxide, sodium oxide and lithium oxide; and the modified layer is generated by a reaction of a dianhydride and a diamine. The color filter material of the present invention includes the above functional material and a quantum dot. The color filter substrate of the present invention includes a color filter film made of the above color filter material.

14 Claims, 1 Drawing Sheet

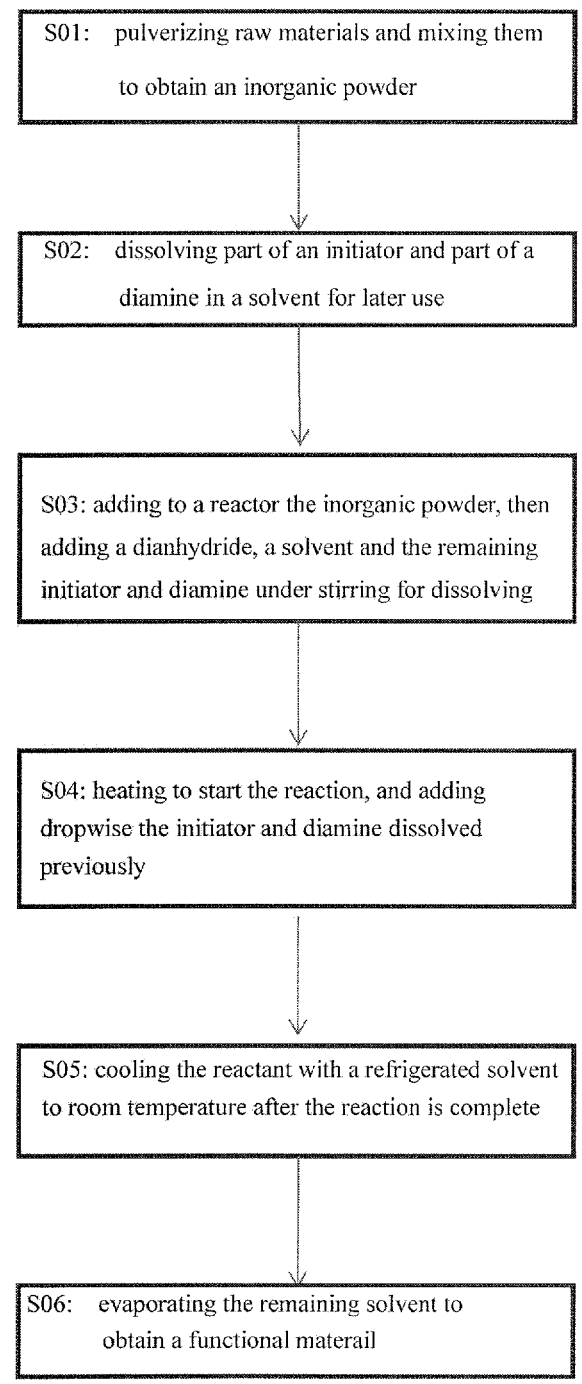

FUNCTIONAL MATERIAL, ITS PREPARATION METHOD, COLOR FILTER MATERIAL, AND COLOR FILTER SUBSTRATE

TECHNICAL FIELD

The present invention relates to the display technical field, in particular to a functional material, its preparation method, a color filter material and a color filter substrate.

BACKGROUND

In liquid crystal display devices and some organic light emitting diode display devices, color display is achieved by light filtering of a color filter film. A color filter film is typically provided on a color filter substrate and is obtained by curing a color filter material. The color filter material typically comprises ingredients such as a pigment (or dye), a curable resin, a coupling agent, a solvent and the like, and can further comprise a photo-initiator, an additive(s) (e.g., a leveling agent and a defoamer) and the like; wherein the curable resin is used for forming the body of a color filter film upon curing, while the pigment (or dye) is used for imparting a desired color (such as red, green, blue, yellow, etc.) to the color filter film.

However, any display device will inevitably produce certain electromagnetic radiation pollution during use, and lead to adverse effects on human health. Since a pigment or dye is generally an organic compound with poor heat resistance, it will affect the heat resistance of the color filter film. Meanwhile, the color saturation of current pigments or dyes is unsatisfactory, and therefore the color of a color filter film can hardly meet the requirement of true color.

SUMMARY OF THE INVENTION

Regarding the problem that existing color filter films are environmentally unfriendly and have poor heat resistance and unsatisfactory colors, the present invention provides a functional material, its preparation method, a color filter material and a color filter substrate, which can solve the above problem.

One technical solution employed to solve a technical problem of the present invention is a functional material comprising an inorganic powder whose surface has a modified layer, wherein the inorganic powder comprises any one or more of aluminum oxide, magnesium oxide, zinc oxide, zirconium oxide, silicon dioxide, titanium dioxide, boron oxide, diiron trioxide, calcium oxide, potassium oxide, sodium oxide and lithium oxide; and the modified layer is generated by a reaction of a dianhydride and a diamine.

For example, the molar ratio of the dianhydride to the diamine for generating the modified layer is from 0.85:1 to 1.05:1.

Further preferably, the molar ratio of the dianhydride to the diamine for generating the modified layer is from 0.92:1 to 1.05:1.

For example, the dianhydride for generating the modified layer comprises at least one phenyl group, and the diamine for generating the modified layer comprises at least one phenyl ring or at least one non-phenyl six-membered carbocyclic ring.

Further preferably, the dianhydride for generating the modified layer is selected from any one of pyromellitic dianhydride, trimellitic anhydride, benzophenone dianhydride, biphenyl dianhydride, diphenyl ether dianhydride, and 4,4'-(hexafluoroisopropylidene) diphthalic anhydride (also named as Hexafluoro Dianhydride); and the diamine for generating the modified layer is selected from any one of 3-amino benzylamine, 2,2'-difluoro-4,4'-(9-fluorenylidene) dianiline, 2,2-bis(3-amino-4-hydroxyphenyl) hexafluoropropane, hexahydro-m-xylylene diamine, 1,4-bis(aminomethyl) cyclohexane, 2,2-bis[4-(4-aminophenoxy)phenyl] hexafluoropropane, 2,2-bis(3-amino-4-methylphenyl) hexafluoropropane, 2,2-bis(3-aminophenyl) hexafluoropropane, 2,2-bis(4-aminophenyl) hexafluoropropane, 2,7-diaminofluorene, m-xylylenediamine, and 4,4'-methylene bis (2-ethyl-6-methylaniline).

For example, the inorganic powder has a particle diameter of 1 to 5000 nm.

One technical solution employed to solve a technical problem of the present invention is a method for preparing the above functional material, comprising: mixing the inorganic powder, the dianhydride, and the diamine with an initiator and a solvent uniformly; and reacting the dianhydride with the diamine by heating to form the modified layer on the surface of the inorganic powder.

For example, the mass ratio of the inorganic powder to the substance generated by the reaction of the dianhydride and the diamine is from 20:1 to 1:1.

For example, the heating comprises two stages, specifically: heating at a temperature of 35° C. to 70° C. for 20 to 40 min; and heating at a temperature of 70° C. to 100° C. for 20 to 40 min.

One technical solution employed to solve a technical problem of the present invention is a color filter material, comprising: a curable resin; a coupling agent; a solvent; a quantum dot for producing a color; and the above functional material.

A quantum dot herein refers to a semiconductor material whose size in three dimensions is in a nanometer scale. In such a size, the quantum dot exhibits many unique properties, one of which is that the quantum dot can absorb the energy of light and further emit an energy in the form of light at a specific wavelength (i.e., light with a specific color), thereby achieving conversion of the light color. As such, if a quantum dot is used in a color filter film, then it can absorb a white light from a backlight source or a white organic light-emitting diode and convert it to light with a specific color, thereby serving the function of a pigment or dye.

For example, the curable resin comprises an acrylic resin and an epoxy resin, and without calculating the mass of the modified layer in the functional material, the mass percentages of the components in the color filter material are:
the acrylic resin: 15 to 30%;
the epoxy resin: 1 to 20%;
the coupling agent: 1 to 20%;
the solvent: 50 to 80%; and
the quantum dot: 1 to 10%.

The expression "without calculating the mass of the modified layer in the functional material, the mass percentage of a certain substance in the color filter material" refers to the content of the certain substance in the case that the total mass of all substances in the color filter material (the inorganic powder in the functional material, the acrylic resin, the epoxy resin, the coupling agent, the solvent, the quantum dot and the like) except the modified layer in the functional material is 100%.

For example, the quantum dot has a particle diameter of 2 to 20 nm.

For example, the material of the quantum dot is any one or more of cadmium selenide, cadmium sulfide, zinc sulfide, zinc selenide, calcium sulfide, and calcium selenide.

For example, without calculating the mass of the modified layer in the functional material, the mass percentage of the inorganic powder in the functional material is 0.1 to 2.5% based on the color filter material.

Preferably, without calculating the mass of the modified layer in the functional material, the mass percentage of the inorganic powder in the functional material is 0.1 to 2% based on the color filter material.

More preferably, without calculating the mass of the modified layer in the functional material, the mass percentage of the inorganic powder in the functional material is 0.1 to 1.8% based on the color filter material.

One technical solution employed to solve a technical problem of the present invention is a color filter substrate, comprising a color filter film made of the above color filter material.

Functional materials of the present invention can emit far-infrared light and negative ions. Far-infrared light, after being absorbed by a human body, can allow water molecules in the body to resonate and be activated, which enhances the intermolecular bonding force, thereby activating proteins and other biological macromolecules and bringing the organism cells to the highest vibration level. Furthermore, far-infrared heat can be transferred to a subcutaneous deeper part, thus increasing the temperature of the subcutaneous deeper part, expanding the capillaries, promoting the blood circulation, strengthening the metabolism among tissues, promoting a tissue regeneration capacity, enhancing the organism immunity, and bringing the vivacity. On the other hand, negative ions can decompose and oxidize bacteria and organic substances, and may serve the function of disinfection and sterilization and produce the effect of improving air quality. Therefore, the functional material may play a role in health care and is environmentally friendly.

The surface of the inorganic powder in the functional material of the present invention has a modified layer which can allow the inorganic powder to be well incorporated into a color filter film and can improve the inorganic powder's capacity to emit far-infrared light and negative ions.

The color filter film of the color filter substrate disclosed herein has the above functional material, and therefore can constantly emit far-infrared light and negative ions during use and is environmentally friendly. Meanwhile, the color filter film does not comprise pigments, dyes and the like. Instead, color is produced using quantum dots, and therefore it exhibits good heat resistance and the color produced thereby is bright and has a high saturation.

BRIEF DESCRIPTION OF THE DRAWING

FIG. 1 is a flow chart of the method for preparing the functional material according to one embodiment of the present invention.

DETAILED DESCRIPTION

To enable those skilled in the art to better understand the technical solution of the present invention, further detailed descriptions are made for the present invention with reference to the drawings and embodiments.

The present embodiment provides a functional material and a method for preparing the same.

The functional material comprises an inorganic powder whose surface has a modified layer, wherein the inorganic powder comprises any one or more of aluminum oxide, magnesium oxide, zinc oxide, zirconium oxide, silicon dioxide, titanium dioxide, boron oxide, diiron trioxide, calcium oxide, potassium oxide, sodium oxide and lithium oxide; and the modified layer is generated by a reaction of a dianhydride and a diamine.

The particle diameter of the inorganic powder is from nanometers to micrometers, specifically, e.g., 1 to 5000 nm, preferably 10 to 500 nm. The particle diameter may be measured for example by a Malvern laser particle size analyzer.

Dianhydride refers to a substance containing at least two anhydride groups in the molecular structure, and diamine refers to a substance containing at least two amine groups (or amino groups) in the molecular structure.

The dianhydride, for example, contains at least one phenyl group, and is preferably any one of pyromellitic dianhydride, trimellitic anhydride, benzophenone dianhydride, biphenyl dianhydride, diphenyl ether dianhydride, and 4,4'-(hexafluoroisopropylidene) diphthalic anhydride (also named as hexafluoro dianhydride).

The diamine, for example, contains at least one phenyl ring or at least one non-phenyl six-membered carbocyclic ring (e.g. cyclohexyl), and is preferably any one of 3-aminobenzyl amine, 2,2-difluoro-4,4'-(9-fluorenylidene) dianiline, 2,2-bis(3-amino-4-hydroxyphenyl) hexafluoropropane, hexahydro-m-xylylene diamine, 1,4-bis(aminomethyl) cyclohexane, 2,2-bis[4-(4-aminophenoxy)phenyl] hexafluoropropane, 2,2-bis(3-amino-4-methylphenyl) hexafluoropropane, 2,2-bis(3-aminophenyl) hexafluoropropane, 2,2-bis(4-aminophenyl) hexafluoropropane, 2,7-diaminofluorene, m-xylylene diamine, and 4,4'-methylene bis(2-ethyl-6-methylaniline).

The molar ratio of the dianhydride to the diamine is from 0.85:1 to 1.05:1, preferably from 0.92:1 to 1.05:1.

Our study has revealed that the modified layer generated by the reaction of the above dianhydride and diamine can desirably improve the properties of the inorganic powder.

Functional materials of the present embodiment can emit far-infrared light and negative ions. Far-infrared light, after being absorbed by a human body, can allow water molecules in the body to resonate and be activated, which enhances the intermolecular bonding force, thereby activating proteins and other biological macromolecules and bringing the organism cells to the highest vibration level. Furthermore, far-infrared heat can be transferred to a subcutaneous deeper part, thus increasing the temperature of the subcutaneous deeper part, expanding the capillaries, promoting the blood circulation, strengthening the metabolism among tissues, promoting a tissue regeneration capacity, enhancing the organism immunity, and bringing the vivacity. On the other hand, negative ions can decompose and oxidize bacteria and organic substances, and may serve the function of disinfection and sterilization and produce the effect of improving air quality. Therefore, the functional material may play a role in health care and is environmentally friendly.

The method for preparing the above functional material comprises: mixing the inorganic powder, the dianhydride, and the diamine with an initiator and a solvent uniformly; and reacting the dianhydride with the diamine by heating to form the modified layer on the surface of the inorganic powder.

Specifically, as shown in FIG. 1, the above preparation method may comprise:

S01 in the case of using a dispersant, pulverizing various materials into powder respectively and then uniformly mixing them proportionally, or uniformly mixing various materials proportionally and then pulverizing them, to yield an inorganic powder.

The dispersant may be chosen from conventional dispersants such as BYK 161 manufactured by BYK Additives & Instruments and Solsperse 32500 and Solsperse 22000 manufactured by The Lubrizol Corporation. Pulverization may be carried out using conventional methods such as ball milling, grinding, and the like. As the inorganic powder may be prepared by existing methods, no further details will be provided herein.

S02, dissolving from a fourth to a third of an initiator and from a fourth to a third of a diamine in a solvent for later use.

The mass ratio of the inorganic powder to the substance generated by the reaction of the dianhydride and the diamine is from 20:1 to 1:1.

That is to say, the amounts of the dianhydride and the diamine are determined according to the following manner: assuming a complete reaction between the dianhydride and the diamine to yield a resultant (which is actually a modified layer), if the mass of the resultant is 1, then the mass of the inorganic powder will be between 1 and 20; such an amount can ensure that a modifier layer with a suitable thickness can be obtained on the inorganic powder.

An initiator is used to initiate the reaction, which, for example, is a nitrogen-based initiator, and is preferably any one of azo bisisobutyronitrile, 2,2'-azo bis(2,4-dimethylvaleronitrile), dimethyl azo bisisobutyrate, and azo bisisovaleronitrile.

The solvent can be selected from fatty alcohols, glycol ethers, ethyl acetate, methyl ethyl ketone, methyl isobutyl ketone, ethylene glycol monomethyl ether ester, γ-butyrolactone, ethyl 3-ethoxypropionate, butyl carbitol, butyl carbitol acetate, propylene glycol monomethyl ether, propylene glycol monomethyl ether acetate, cyclohexane, xylene, isopropanol, and other conventional organic solvents. Since the solvent merely serves to disperse various substances, propylene glycol monomethyl ether acetate is used as a solvent in the process of specifically preparing the functional material in all the Examples.

S03, adding the inorganic powder to a reaction vessel (e.g., a four-neck flask) which is then subjected to stirring, shocking, shaking and the like; afterwards, adding the dianhydride and the solvent as well as the remaining initiator and diamine and allowing them to be dissolved uniformly.

S04, heating to carry out the reaction, preferably in two stages, specifically comprising: heating at a temperature of 35° C. to 70° C. for 20 to 40 min; and then continuing heating at a temperature of 70 to 100° C. for 20 to 40 min During the above heating process, the dianhydride and the diamine are allowed to react, thereby generating a modified layer on the surface of the inorganic powder; wherein heating is carried out in two stages so as to prevent the reaction from being too severe.

During the reaction process, the above solution prepared by dissolving an initiator and a diamine is gradually added dropwise to a four-neck flask so as to prevent the reaction from being too severe.

The reaction in this step may be carried out, for example, under the protection of nitrogen, and for example under constant stirring.

The solvent in each step is in an amount sufficient to disperse and dissolve the substances therein uniformly, and the initiator is in an amount sufficient to initiate the reaction. These amounts can be adjusted by those skilled in the art according to the actual conditions, and thus no further detail is given herein. However, generally speaking, the mass ratio (referring to the total amount) of the inorganic powder, the initiator and the solvent is 1:(0.25 to 0.4):(1 to 1.5). To achieve consistency in the process of preparing the functional material in the various Examples, the mass ratio of the inorganic powder, the initiator and the solvent is 1:0.3:1.4.

S05, cooling the reactant with a refrigerated solvent to room temperature (about 10 to 30° C.) after the reaction is over.

S06, evaporating the remaining solvent or separating the powder therefrom to yield an inorganic powder with a modified layer, i.e., a functional material.

Of course, it should be appreciated that the preparation method described above may also undergo many changes, for example, the dianhydride, the diamine, the initiator and the like can all be dissolved in a solvent once; for another example, heating can be carried out at only one stage. After all, any variation is allowed as long as the dianhydride and the diamine can react to form a modified layer on the surface of the inorganic powder.

The present embodiment further provides a color filter material, comprising: a curable resin; a coupling agent; a solvent; a quantum dot for producing a color; and the above functional material.

The color filter material can be cured to form a color filter film. Since the color filter film comprises the above functional material, it can constantly emit far-infrared light and negative ions, thereby improving the environment. Meanwhile, the color filter film does not comprise pigments, dyes and the like, rather, color is produced using quantum dots, and therefore it exhibits good heat resistance and the color produced thereby is bright and has high saturation.

For example, the curable resin comprises an acrylic resin and an epoxy resin, and without calculating the mass of the modified layer in the functional material, the mass percentages of the components in the color filter material are:
the acrylic resin: 15 to 30%;
the epoxy resin: 1 to 20%;
the coupling agent: 1 to 20%;
the solvent: 50 to 80%; and
the quantum dot: 1 to 10%.

That is to say, the contents of the components are as above in the case that the total mass of all substances in the color filter material (the inorganic powder in the functional material, the acrylic resin, the epoxy resin, the coupling agent, the solvent, the quantum dot and the like) except the modified layer in the functional material is 100%.

The curable resins (acrylic resin and epoxy resin) are used for forming the body of a color filter film by curing. For example, the acrylic resin can be a methyl acrylate resin, an ethyl acrylate resin, a methyl methacrylate resin, an ethyl methacrylate resin, polyester acrylate, polyurethane acrylate, an epoxy acrylate resin or the like; and its content is, for example, 15 to 25%. Moreover, the epoxy resin can be an aliphatic epoxy resin, a bisphenol A type epoxy resin or the like; and its content is, for example, 1 to 10%.

The coupling agent is used for crosslinking and curing the curable resin, which is for example, a silane coupling agent such as vinyl silane, amino silane, epoxy silane, mercapto silane, methacryloxy silane or the like; and its content is, for example, 1 to 10%.

A quantum dot herein refers to a semiconductor material whose size in three dimensions is in a nanometer scale. In such a size, the quantum dot exhibits many unique properties, one of which is that the quantum dot can absorb the energy of light and further emit an energy in the form of light at a specific wavelength (i.e., light with a specific color), thereby achieving conversion of the light color. As such, if a quantum dot is used in a color filter film, then it can absorb a white light from a backlight source or a white organic light-emitting diode and convert it to light with a specific color, thereby serving the function of a pigment or dye.

In a color filter material, the color of the light emitted by a quantum dot is associated with its particle diameter and material. As for a quantum dot prepared from a certain material, the quantum dot having a specific particle diameter will emit light with a determined and corresponding color.

The relationship among the quantum dot material, the particle diameter, and the luminous color is known and can be determined by those skilled in the art according to the specific requirement. However, the quantum dot generally has a particle diameter in the range of between 2 and 20 nm.

The material for quantum dots can specifically be any one or more of cadmium selenide, cadmium sulfide, zinc sulfide, zinc selenide, calcium sulfide, and calcium selenide. Moreover, the quantum dots have a content of, for example, 1 to 5%.

The color filter material further comprises the above functional material, and therefore the color filter film prepared therefrom can emit far-infrared light and negative ions. Without calculating the mass of the modified layer in the functional material, the mass percentage of the inorganic powder in the functional material is for example 0.1 to 2.5%, preferably 0.1 to 2%, more preferably 0.1 to 1.8% based on the color filter material.

The solvent is used for dissolving and dispersing other components to form a uniform and stable system and can be a conventional organic solvent, such as methyl ethyl ketone, methyl isobutyl ketone, ethylene glycol monomethyl ether ester, γ-butyrolactone, ethyl 3-ethoxypropionate, butyl carbitol, butyl carbitol acetate, propylene glycol monomethyl ether, propylene glycol monomethyl ether acetate, diethylene glycol methyl ethyl ether, or the like.

The functional material of the Examples was prepared using the above preparation method according to the parameters in the following table.

TABLE 1

Relevant parameters of the functional material (content unit: by mass parts)

| | Example # | 1 | 2 | 3 | 4 | 5 | 6 |
|---|---|---|---|---|---|---|---|
| Inorganic powder | aluminum oxide amount | 0.002 | none | 0.014 | 0.019 | 0.024 | 0.029 |
| | titanium oxide Amount | 0.056 | 0.224 | 0.337 | 0.449 | 0.561 | 0.673 |
| | zirconium oxide amount | 0.021 | 0.124 | 0.126 | 0.168 | 0.21 | 0.252 |
| | silicon oxide amount | 0.01 | none | 0.06 | 0.08 | 0.1 | 0.12 |
| | boron oxide amount | 0.006 | 0.024 | 0.036 | 0.048 | none | 0.72 |
| | diiron trioxide amount | 0.003 | 0.012 | 0.018 | 0.024 | 0.03 | 0.036 |
| | sodium oxide amount | 0.002 | 0.006 | 0.009 | 0.012 | 0.015 | 0.02 |
| | Total amount | 0.1 | 0.39 | 0.6 | 0.8 | 0.94 | 1.85 |
| Type of dianhydride | | pyromellitic dianhydride | pyromellitic dianhydride | diphenyl ether dianhydride | pyromellitic dianhydride | diphenyl ether dianhydride | hexafluoro dianhydride |
| Type of diamine | | 3-amino benzylamine | hexahydro-m-xylylene diamine | m-xylylene diamine | 3-amino benzylamine | hexahydro-m-xylylene diamine | 3-amino benzylamine |
| Molar ratio of dianhydride to diamine | | 0.85 | 0.87 | 0.92 | 1 | 1.05 | 1.05 |
| Mass ratio of inorganic powder to reaction product | | 20 | 10 | 8 | 15 | 1 | 4 |
| Initiator for preparing the function material | | Azodiiso butyronitrile | Azodiiso butyronitrile | Azobisiso valeronitrile | Azobisiso valeronitrile | Azodiiso butyronitrile | Azodiiso butyronitrile |
| Heating temp. at the 1st stage (° C.) | | 35 | 40 | 70 | 60 | 50 | 55 |
| Heating time at the 1st stage (min) | | 40 | 40 | 20 | 25 | 30 | 25 |
| Heating temp. at the 2nd stage (° C.) | | 75 | 85 | 75 | 80 | 70 | 90 |
| Heating time at the 2nd stage (min) | | 40 | 25 | 30 | 35 | 40 | 30 |
| | Example # | 7 | 8 | 9 | 10 | | |
| Inorganic powder | aluminum oxide amount | 0.033 | 0.038 | 0.043 | 0.048 | | |
| | titanium oxide Amount | 0.785 | 0.898 | 1.01 | 1.122 | | |
| | zirconium oxide amount | 0.294 | 0.336 | 0.378 | 0.42 | | |
| | silicon oxide amount | 0.14 | 0.16 | 0.18 | none | | |
| | boron oxide amount | 0.084 | 0.096 | 0.108 | 0.32 | | |
| | diiron trioxide amount | 0.042 | 0.048 | 0.054 | 0.06 | | |
| | sodium oxide amount | 1.122 | 0.024 | 0.027 | 0.03 | | |
| | Total amount | 2.5 | 1.6 | 1.8 | 2 | | |
| Type of dianhydride | | hexafluoro dianhydride | diphenyl ether dianhydride | hexafluoro dianhydride | hexafluoro dianhydride | | |
| Type of diamine | | m-xylylene diamine | 2,7-diamino fluorene | m-xylylene diamine | 2,7-diamino fluorene | | |
| Molar ratio of dianhydride to diamine | | 1 | 0.9 | 0.9 | 0.85 | | |
| Mass ratio of inorganic powder to reaction product | | 20 | 1 | 7.5 | 16 | | |
| Initiator for preparing the function material | | Dimethyl azobis isobutyrate | Azodiiso butyronitrile | Azobisiso valeronitrile | Azobisiso valeronitrile | | |
| Heating temp. at the 1st stage (° C.) | | 55 | 65 | 70 | 35 | | |
| Heating time at the 1st stage (min) | | 30 | 35 | 35 | 35 | | |
| Heating temp. at the 2nd stage (° C.) | | 90 | 100 | 95 | 70 | | |
| Heating time at the 2nd stage (min) | | 20 | 20 | 25 | 35 | | |

A color filter material was formulated using the above functional materials and quantum dots according to the parameters in the following table. There was no need to employ a specific adding sequence and a specific mixing method as long as the various components can be mixed uniformly.

In the Examples, the SB401 Type acrylic resin was used as an acrylic resin; the DEN438 Type epoxy resin was used as an epoxy resin; the A186 Type coupling agent was used as a coupling agent; propylene glycol methyl ether acetate (PMA) was used as a solvent; and commercial quantum dots of a corresponding color were used as quantum dots.

Afterwards, a color filter film was formed using the color filter material. Specifically, the color filter material was coated onto a substrate, prebaked at 90° C. for 3 min, exposed under an energy of 50 mJ/cm$^2$, and finally heated at a temperature of 220° C. for 20 min for curing so as to form a color filter film with a thickness of 1.5 min.

In the color filter materials, all the components except the functional materials and quantum dots are conventional, and therefore the color filter materials share these components to achieve comparability of the results.

Subsequently, the infrared emissivity of the color filter film was measured according to the GB/T 7287-2008 standard, and the amount of negative ions produced thereby was measured using an air anion analyzer (for example, Japanese KEC Corporation's KEC-900 type); the brightness and color coordinate of the light emitted thereby were measured using a spectrophotometer (e.g., a UV-visible spectrophotometer UV2550 from Shimadzu Corporation, Japan) and then the color saturation was calculated. The results were shown in the following table.

The present embodiment further provides a color filter substrate, comprising a color filter film made of the above color filter material.

The color filter film was obtained by curing a color filter material, and its specific thickness, curing parameters and the like can be adjusted according to the requirement. Generally speaking, a color filter film had a thickness of 1 to 3 μm, and thermal curing had a heating temperature of 180° C. to 250° C. for a period of 10 to 30 min.

Of course, in the color filter substrates, color filter films with various colors are provided at positions corresponding to different pixel units. Moreover, these color filter films can be formed in several steps, i.e., a color filter material with one color is sprayed at a corresponding position by an inkjet printing process and then is cured to form a color filter film with one color each time, followed by preparing color filter films with other colors; alternatively, color filter films with various colors can be formed simultaneously, i.e., color filter materials with various colors are sprayed at corresponding positions of a substrate in order by an inkjet printing process and then uniformly cured.

Of course, the color filter substrate may further comprise other known structures, for example, the color filter film may be covered with a moisture barrier material layer to prevent the color filter film from being damaged by moisture; for another example, as for color filter substrates used in liquid crystal display devices, they may further comprise other known structures such as common electrode layers, black matrixes, etc.; for a further example, as for a color filter substrate used in organic light-emitting diode display devices, if it is integrated with an array substrate (i.e., a

TABLE 2

Relevant parameters of the color filter material and the color filter film (content unit: by mass parts)

| Example | 1 | 2 | 3 | 4 | 5 | 6 | 7 | 8 | 9 | 10 |
|---|---|---|---|---|---|---|---|---|---|---|
| Amount of inorganic powder in functional material | 0.1 | 0.39 | 0.6 | 0.8 | 0.94 | 1.85 | 2.5 | 1.6 | 1.8 | 2 |
| Amount of quantum dot | 1 | 1 | 1.5 | 2 | 3 | 3 | 4 | 5 | 5 | 10 |
| Luminous color of quantum dot | Red | Green | Blue | Red | Green | Blue | Red | Green | Blue | Red |
| Amount of acrylic resin | 15 | 1 | 35 | 18.5 | 20 | 5 | 12.9 | 10 | 20 | 18 |
| Amount of epoxy resin | 20 | 18 | 4.5 | 6 | 4 | 6 | 10 | 5 | 8 | 7.5 |
| Amount of coupling agent | 13.9 | 20 | 4 | 5.5 | 7 | 3 | 2 | 5 | 2 | 4.5 |
| Amount of solvent | 50 | 59.61 | 54.4 | 67.2 | 64.06 | 81.15 | 68.6 | 73.4 | 63.2 | 58 |
| Far-infrared emissivity (%) | 50 | 62 | 83 | 90 | 91 | 92 | 93 | 94 | 95 | 96 |
| Anion concentration (/cm$^3$) | 120 | 470 | 700 | 920 | 1150 | 1500 | 1590 | 1800 | 2000 | 2200 |
| Color saturation (%) | 73.0 | 76.0 | 80.0 | 83.0 | 87.0 | 90.0 | 92.0 | 95.0 | 96.0 | 98.0 |
| Brightness | 29.7 | 29.6 | 29.3 | 28.9 | 28.7 | 28.3 | 27.9 | 26.1 | 25.8 | 25.2 |

It can be seen that the color filter films of the various Examples had high infrared emissivity and anion concentration, which suggests that they can generate far-infrared light and negative ions, thereby improving the environment. Meanwhile, the color filter films exhibited excellent brightness and color saturation, which demonstrates that incorporation of a functional material has no adverse effects on their own properties. Furthermore, since light was emitted using quantum dots, the color filter films exhibited high brightness and color saturation as well as excellent heat resistance, which met higher requirements for their colors.

The surface of the inorganic powder in the functional material of the present embodiment had a modified layer capable of allowing the inorganic powder to be well incorporated into a color filter film and improving the inorganic powder's capacity to emit far-infrared light and negative ions.

GOA mode), then it may comprise other known structures such as an organic light-emitting diode (OLED), a pixel defined layer (PDL) and the like.

It should be appreciated that the above embodiments are merely exemplary embodiments to illustrate the principles of the present invention, but the present invention is not limited thereto. Those of ordinary skill in the art, without departing from the spirit and essence of the present invention, may make various changes and improvements. Such changes and improvements are deemed within the scope of the invention.

The present application claims the priority of the Chinese Patent Application No. 201410366647.6 filed on Jul. 29, 2014, which is incorporated herein by reference as part of the disclosure of the present application.

What is claimed is:

1. A color filter material, comprising:
    a curable resin;
    a coupling agent;
    a solvent;
    a quantum dot for producing color; and
    a functional material comprising an inorganic powder whose surface has a modified layer, wherein
    the inorganic powder comprises any one or more of aluminum oxide, magnesium oxide, zinc oxide, zirconium oxide, silicon dioxide, titanium dioxide, boron oxide, diiron trioxide, calcium oxide, potassium oxide, sodium oxide and lithium oxide; and
    the modified layer is generated by a reaction of a dianhydride and a diamine.

2. The color filter material according to claim 1, wherein the curable resin comprises an acrylic resin and an epoxy resin, and without calculating the mass of the modified layer in the functional material, the mass percentages of the components in the color filter material are:
    the acrylic resin: 15 to 30%;
    the epoxy resin: 1 to 20%;
    the coupling agent: 1 to 20%;
    the solvent: 50 to 80%; and
    the quantum dot: 1 to 10%.

3. The color filter material according to claim 1, wherein the quantum dot has a particle diameter of 2 to 20 nm.

4. The color filter material according to claim 1, wherein the material of the quantum dot is any one or more of cadmium selenide, cadmium sulfide, zinc sulfide, zinc selenide, calcium sulfide, and calcium selenide.

5. The color filter material according to claim 1, wherein without calculating the mass of the modified layer in the functional material, the mass percentage of the inorganic powder in the functional material is 0.1 to 2.5% based on the color filter material.

6. The color filter material according to claim 5, wherein without calculating the mass of the modified layer in the functional material, the mass percentage of the inorganic powder in the functional material is 0.1 to 2% based on the color filter material.

7. The color filter material according to claim 6, wherein without calculating the mass of the modified layer in the functional material, the mass percentage of the inorganic powder in the functional material is 0.1 to 1.8% based on the color filter material.

8. A color filter substrate, comprising:
    a color filter film formed from the color filter material according to claim 1.

9. The color filter material according to claim 1, wherein the molar ratio of the dianhydride to the diamine for generating the modified layer is between 0.85:1 and 1.05:1.

10. The color filter material according to claim 9, wherein the molar ratio of the dianhydride to the diamine for generating the modified layer is between 0.92:1 and 1.05:1.

11. The color filter material according to claim 1, wherein
    the dianhydride for generating the modified layer comprises at least one phenyl group; and
    the diamine for generating the modified layer comprises at least one phenyl ring or at least one non-phenyl six-membered carbocyclic ring.

12. The color filter material according to claim 11, wherein
    the dianhydride for generating the modified layer is selected from any one of pyromellitic dianhydride, trimellitic anhydride, benzophenone dianhydride, biphenyl dianhydride, diphenyl ether dianhydride, and 4,4'-(hexafluoroisopropylidene)diphthalic anhydride; and
    the diamine for generating the modified layer is selected from any one of 3-amino benzylamine, 2,2'-difluoro-4,4'-(9-fluorenylidene) dianiline, 2,2-bis(3-amino-4-hydroxyphenyl) hexafluoropropane, hexahydro-m-xylylene diamine, 1,4-bis(aminomethyl) cyclohexane, 2,2-bis[4-(4-aminophenoxy)phenyl] hexafluoropropane, 2,2-bis(3-amino-4-methylphenyl) hexafluoropropane, 2,2-bis(3-aminophenyl) hexafluoropropane, 2,2-bis(4-aminophenyl) hexafluoropropane, 2,7-diamino fluorene, m-xylylene diamine, and 4,4'-methylene bis (2-ethyl-6-methylaniline).

13. The color filter material according to claim 1, wherein the inorganic powder has a particle diameter of 1 to 5000 nm.

14. The color filter substrate according to claim 8, wherein the curable resin comprises an acrylic resin and an epoxy resin, and without calculating the mass of the modified layer in the functional material, the mass percentages of the components in the color filter material are:
    the acrylic resin: 15 to 30%;
    the epoxy resin: 1 to 20%;
    the coupling agent: 1 to 20%;
    the solvent: 50 to 80%; and
    the quantum dot: 1 to 10%.

* * * * *